US012571660B2

(12) United States Patent
Levac et al.

(10) Patent No.: US 12,571,660 B2
(45) Date of Patent: Mar. 10, 2026

(54) FIBER-OPTIC EQUIPMENT ENCLOSURE SENSORS

(71) Applicant: PREFORMED LINE PRODUCTS CO., Mayfield Village, OH (US)

(72) Inventors: Daniel Joseph Levac, Gahanna, OH (US); Adam Michael Deel, Bay Village, OH (US); Randy Gene Cloud, Mentor, OH (US); David Anthony Koehler, Mayfield Village, OH (US); Jaanki Kirit Thakkar, Mayfield Village, OH (US); Benjamin Franklin Ciesielczyk, Mayfield Village, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 18/223,447

(22) Filed: Jul. 18, 2023

(65) Prior Publication Data

US 2023/0358573 A1 Nov. 9, 2023

Related U.S. Application Data

(63) Continuation of application No. 17/335,057, filed on May 31, 2021, now Pat. No. 11,703,360.

(51) Int. Cl.
| | |
|---|---|
| *G01D 5/26* | (2006.01) |
| *G01H 9/00* | (2006.01) |
| *G01L 27/00* | (2006.01) |

(52) U.S. Cl.
CPC ............. *G01D 5/268* (2013.01); *G01H 9/004* (2013.01); *G01L 27/007* (2013.01); *G01N 2201/084* (2013.01)

(58) Field of Classification Search
CPC ...... G01D 5/268; G01H 9/004; G01L 27/007; G01N 2201/084
See application file for complete search history.

(56) References Cited

U.S. PATENT DOCUMENTS

| | | | | |
|---|---|---|---|---|
| 11,022,465 B2 * | 6/2021 | Levac | .................... | G01H 9/004 |
| 11,703,360 B2 * | 7/2023 | Levac | ................... | G01L 27/007 |
| | | | | 73/29.03 |

(Continued)

FOREIGN PATENT DOCUMENTS

WO    WO-2010131848 A2 * 11/2010    ........... G02B 6/4451

OTHER PUBLICATIONS

English Machine Translation of WO 2010/131848 A2 (Year: 2010).*

*Primary Examiner* — David Z Huang
(74) *Attorney, Agent, or Firm* — Cooper Legal Group, LLC

(57) ABSTRACT

Fiber-optic equipment is often deployed in various locations, and performance of fiber-optic transmissions may be monitored as a gauge of equipment status to prevent costly and inconvenient communication outages. Events that damage equipment that eventually result in outage and may be desirable to address proactively, but the occurrence of such events may be difficult to detect only through equipment performance. Presented herein are techniques for monitoring and maintaining fiber-optic equipment performance via enclosure sensors that measure physical properties within a fiber-optic equipment enclosure, such as temperature, pressure, light, motion, vibration, and moisture, which are often diagnostic and predictive of causes of eventual communication outages, such as temperature-induced cable loss (TICL), incomplete flash-testing during installation, exposure to hazardous environmental conditions, and tampering. An enclosure sensor package transmits the physical measurements to a monitoring station, and automatic determination of enclosure-related events may enable triaging and transmission of repair alerts to maintenance personnel.

20 Claims, 10 Drawing Sheets

(56)               References Cited

U.S. PATENT DOCUMENTS

2009/0109021 A1 *   4/2009   Paoletti ................ G01R 31/343
                                                                702/184
2013/0148127 A1 *   6/2013   Sheth .................. F04D 15/0088
                                                                356/213
2016/0191485 A1 *   6/2016   Rajangam ............. H04W 12/06
                                                                707/610

* cited by examiner

500

502

402

102

504

106

402

500

506

106

402

102

508

402

106

FIBER-OPTIC EQUIPMENT ENCLOSURE SENSORS

CROSS-REFERENCE TO RELATED APPLICATIONS

This application is a continuation of, and claims priority to U.S. Non-Provisional patent application Ser. No. 17/335, 057 filed on May 31, 2021 which claimed priority to U.S. Non-Provisional patent application Ser. No. 16/339,915 filed on Apr. 5, 2019 which is a national stage filing under 35 U.S.C. § 371 claiming priority to International Application No. PCT/US2017/055575, entitled "FIBER-OPTIC EQUIP-MENT ENCLOSURE SENSORS" filed on Oct. 6, 2017 which claimed priority to U.S. Provisional Patent Application No. 62/405,434, entitled "MONITORING SYSTEM," filed on Oct. 7, 2016, the entirety of these applications is hereby incorporated by reference as if fully rewritten herein.

BACKGROUND

Within the field of telecommunication, many scenarios involve the deployment throughout a region of a fiber-optic cable network, including fiber-optic equipment such as hubs, converters, switches, repeaters, and fiber-optic splices. Equipment is often deployed in enclosure that provides security and shelter from environmental conditions such as sunlight, moisture, and animals. In such scenarios, the performance of the cabling and equipment may be monitored by monitoring performance; e.g., damaged cables may be identified by detecting a loss of transmission capability or attenuation of signal strength, and equipment damage may be identified by detecting an unacceptable error rate or a loss of throughput.

Because fiber-optic outages are often costly and inconvenient, it is desirable to predict and prevent outages. As a first example, diminishing performance may signal an eventual failure, and replacement of the equipment or cabling in a proactive manner, even while exhibiting diminished but acceptable performance, may avoid a sudden failure at a later date. As a second example, remotely monitoring some environmental properties, such as temperatures throughout the region, may indicate the occurrence of events that may have caused equipment to incur damage, necessitating testing or proactive replacement. In this manner, the performance of the fiber-optic network may be preserved through a diligent maintenance regimen. As a third such example, routine maintenance schedules may be adopted to test and replace equipment on a periodic basis.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Maintaining the performance of a fiber-optic communications network through techniques such as performance testing may address some types of failure but may not enable the detection and proactive response to other types of failure.

As a first example, conditions such as temperature-induced cable loss (TICL) may occur when equipment in an enclosure is exposed to extreme temperatures for an extended period. While damage may be incurred gradually during exposure, the eventual failure of the equipment may occur suddenly and without incremental signal degradation. Moreover, generalized temperature monitoring may indicate a possibility of temperature-related damage, but the temperature in a region may significantly differ from the temperature within each equipment enclosure, e.g., due to variations in enclosure insulation, localized climate variation, and the contribution of heat produced by the equipment. Predictions of temperature-related damage drawn from regional climate may therefore exhibit numerous false negatives (e.g., where equipment was presumed to be adequately protected via insulation and were not tested or replaced, but where an insulation failure caused damage to be incurred) and/or false positives (e.g., where equipment was presumed to have been damaged by extreme temperatures, but where temperatures within the enclosure remained within an acceptable range).

As a second example, deployment often involves "flashtesting" equipment after installation by pressurizing the enclosure to verify sealing, but a failure to flash-test or inadequate flash-testing may result in an enclosure that is not fully airtight. While the installed equipment may exhibit full performance for a time. However, exposure to moisture may cause leakage that damages equipment in an undetected manner, and causes a sudden communication outage that was undetectable via performance monitoring.

As a third example, equipment in an aerial deployment, such as a utility pole, may be vulnerable to environmental conditions, such as wind and vibration, if the equipment is not properly anchored and/or damped. The risks may be undetectable from performance monitoring (e.g., the equipment may be subjected to vibration and/or may sway in the wind on a loose suspension), and the failure of the suspended equipment (e.g., vibration to the point of breaking, or a failure of the anchoring hardware) may result in a sudden communication outage.

It may be appreciated that these forms of failure and threats to continued performance are difficult to detect solely from performance metrics. Additionally, routine testing may be costly or even hazardous, e.g., if equipment is deployed in remote regions that are difficult and/or dangerous for maintenance personnel to access.

Presented herein are techniques that facilitate the monitoring, diagnosis, maintenance, and repair of fiber-optic telecommunication. In accordance with these techniques, an enclosure of fiber-optic equipment is supplemented with an enclosure monitor, comprising an enclosure sensor that measures one or more physical properties of the enclosure, and a transmitter that transmits messages about the physical properties to a monitoring service. The monitoring service collects messages about the physical properties of the enclosures to determine actual and/or prospective failure conditions and alerts maintenance personnel of tasks to be performed on the enclosures, equipment, and/or cabling. The use of such techniques and hardware may enable a variety of maintenance improvements, such as more accurate diagnosis of failure conditions; more efficient maintenance; and rapid triaging and alerting to address actual and/or developing failures.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
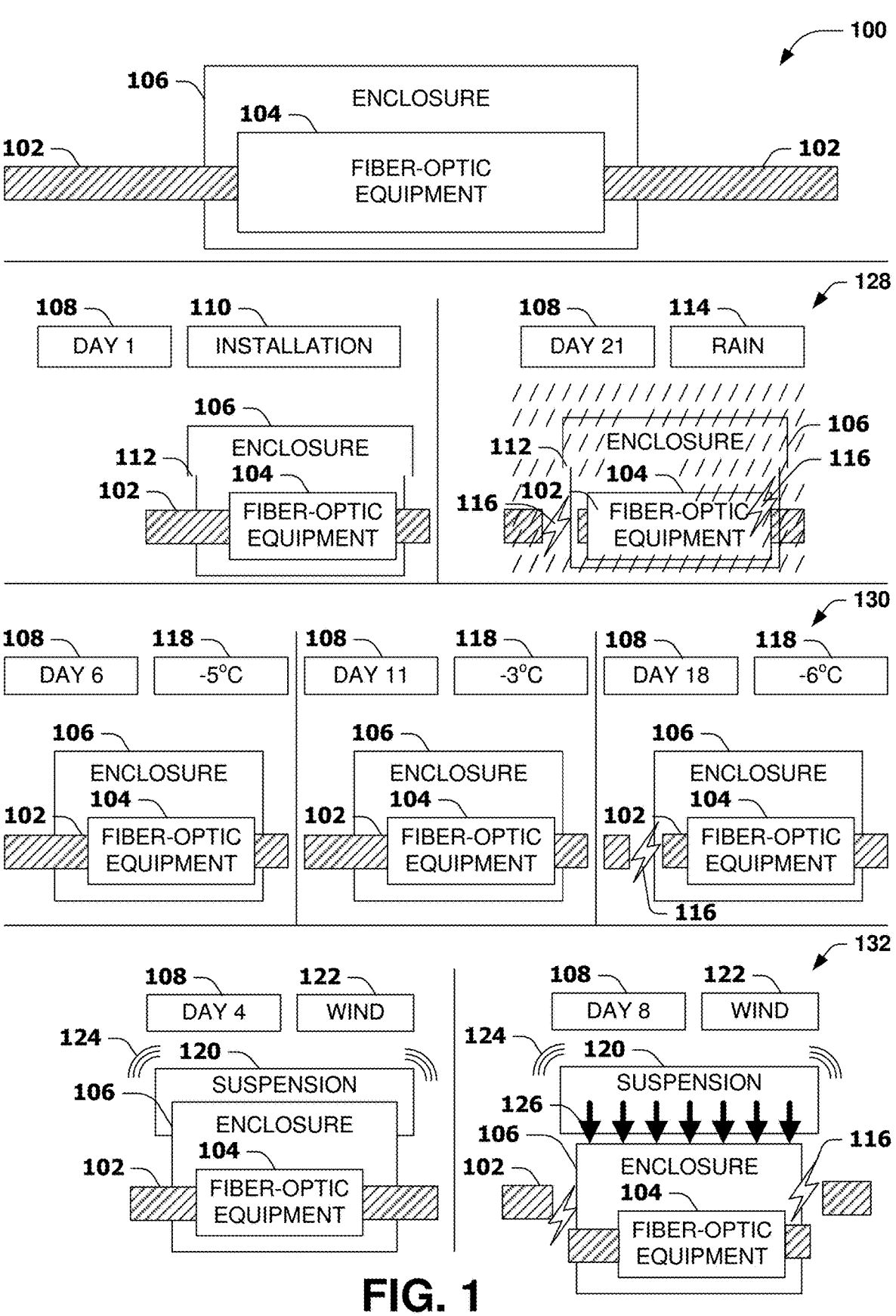
FIG. 1 is an illustration of an example scenario featuring scenarios for maintaining fiber-optic equipment for a fiber-optic cable.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of a set 100 of example scenarios featuring fiber-optic cables 102 comprising a portion of a fiber-optic telecommunication network that may be deployed throughout a region to carry many forms of data, such as voice, video, and/or network communication. In this set 100 of example scenarios, fiber-optic equipment 104 may be deployed to provide and maintain fiber-optic communication, such as hubs, converters, switches, repeaters, and fiber-optic splices.

The fiber-optic equipment 104 is often deployed in regions that may be subjected to a variety of environmental hazards, such as sunlight, moisture, temperature extremes, wind, snow and ice, hail, and interference from animals and humans. Such hazards may result in severed or disconnected cabling or damage to the fiber-optic equipment 104, which may cause a communication outage.

Due to the vast amount of data that fiber-optic equipment may carry and the large user base that fiber-optic networks may serve, outages may be costly and inconvenient. It is therefore advantageous both to recover from outages quickly and to avoid potential future outages through diligent testing and maintenance routines Many techniques may be utilized for both responsive repair and preventive maintenance. As a first example, a remote monitoring station may monitor transmission properties of deployed equipment and cabling, such as transmission rates, error rates, and maximum capacity. Loss of transmission capability or attenuation of signal strength may indicate damage to fiber-optic cabling, high error rates or a loss of throughput. Equipment exhibiting degraded performance may be inspected, tested for faults, and repaired or replaced as necessary.

As a second such example, environmental conditions may be monitored to predict the effects on deployed equipment. For example, temperature-induced cable loss (TICL) may arise from the exposure of cabling to temperature extremes for at least seven days. A monitoring service may monitor the temperatures throughout a region to predict whether equipment or cabling has been exposed to such conditions, and repair and replacement processes may be invoked as a proactive measure.

As a third such example, equipment may be periodically inspected and tested to verify continued performance, and cabling and equipment that is prone to performance loss over time may be replaced according to a maintenance schedule. For example, a service life may be estimated for cabling and equipment based on type and conditions of deployment, and the expiration of service life may prompt a routine replacement, even if apparently performing adequately, in order to prevent an abrupt failure at a later date.

These and other techniques may be utilized to monitor and/or predict some types of failure, and to facilitate proactive and/or reactive maintenance processes. However, some causes of equipment and cabling failure may not be apparent from performance metrics. Failure to detect these processes may result in sudden communication outages or performance degradation. In some cases, failures may result in extended outages, e.g., where the point of failure is remote or difficult to access; where replacement equipment is not readily available; or where concurrent failures occur that exceed available maintenance personnel or transportation.

As a first such example 128, on a first day 108 of an installation 110, fiber-optic equipment 104 may be deployed in an enclosure 106 to service a fiber-optic cable 102 in an outdoor location. Typically, such enclosures 106 are flash-tested to verify sealing of the enclosure 106 to prevent exposure of the fiber-optic equipment 104 to hazards, such as by pressurizing the enclosure 106 above an atmosphere and detecting whether the enclosure 106 holds the pressure (indicating complete sealing) or loses pressure (indicating a leak). However, in some cases, the enclosure 106 may not be sealed, and flash-testing may be omitted, performed or measured incorrectly, or not followed up with corrective measures. As a result, a gap 112 may exist in the enclosure 106, such that at a later day 108 when the enclosure 106 is exposed to rain 114, moisture may leak through the gap 112 and into the enclosure 106, damaging the fiber-optic equipment 104 and causing a sudden outage 116. This type of failure may be difficult to detect by performance monitoring, since the fiber-optic equipment 104 is likely to perform well until the exposure to rain 114.

As a second such example 130, temperature-induced cable loss (TICL) may occur when extreme temperatures 118 occur over a period of time. Equipment so exposed may exhibit a sudden outage 116 at an unpredictable time, particularly if the equipment is believed to be properly insulated (e.g., believed to be deployed inside a shed that provides shelter from weather conditions, but accidentally exposed to the elements; or stored within insulation that is thinner or less effective than believed). Moreover, detecting the application of TICL from regional conditions, as localized conditions may significantly vary. For example, regional temperatures 118 that are marginally within acceptable parameters may locally be more extreme, due to factors such as wind chill or icing (for extreme cold) or direct sunlight (for extreme heat), such that TICL is induced faster than anticipated. Accordingly, preventive testing and maintenance may not be deployed in a timely manner, leading to an unexpected failure.

As a third example 132, an aerial deployment of fiber-optic equipment 104 using a suspension 120, such as mounting on a utility pole. Such deployment may subject the fiber-optic equipment 104 and cable 102 to climate effects such as heavy wind 122. Maintenance personnel may endeavor to secure the enclosure 106 via anchoring, but an inadequate installation or a failure of the anchoring may cause the enclosure 106 to break free, and may therefore exhibit movement 124 (e.g., swaying, rocking, or vibration) when exposed to heavy wind 122. The enclosure 106 may withstand the movement 124 for one or several days 108, and may continue to function with acceptable performance, but an extended period of movement 124 without maintenance—of which maintenance personnel may be unaware, due to the acceptable performance of the fiber-optic equipment 104—may lead to a suspension failure 126, causing the enclosure 106 to separate and fall from the suspension 120 resulting in a communication outage 116, as well as damage to the fiber-optic equipment 104, the fiber-optic cable 102 that may be severed or bent beyond use, and/or harm to individuals or damage to property positioned underneath the suspension 120.

These and other problems may arise from hazards imposed upon the fiber-optic equipment 104 that may not be detectable by looking at performance, or even by inspection or onsite testing. Such hazards may also not be reflected by generalized models of fiber-optic equipment performance due to unforeseen conditions. Additionally, it may be possible to guard against such undetectable failures through a diligent maintenance schedule, e.g., replacing all equipment that is likely to have been damaged by TICL during a period of extreme weather. However, just as these events may induce false negatives (in which fiber-optic equipment 104 that is believed to be in good condition suddenly fails to undetected faults), additional inefficiency may result from an abundance of caution. For example, regional temperatures 118 that are believed to induce TICL may not actually apply to a particular installation of fiber-optic equipment 104 that is protected to an extent, and therefore undamaged by the extreme climate. Dispatching maintenance personnel to inspect, test, and optionally replace such equipment may be wasteful—both in terms of unnecessary effort and equipment, and in terms of diverting resources from other maintenance tasks that may be more productive.

For at least these reasons, it is desirable to develop new techniques for predicting, preventing, detecting, and/or responding to potential communication outages—in particular, techniques that are more accurate at assessing the condition of the fiber-optic cable 102 and/or fiber-optic equipment 104 on a specific and frequent basis, and in an automated manner that is not dependent upon inspection or testing by maintenance personnel.

B. Presented Techniques

Figure 2:
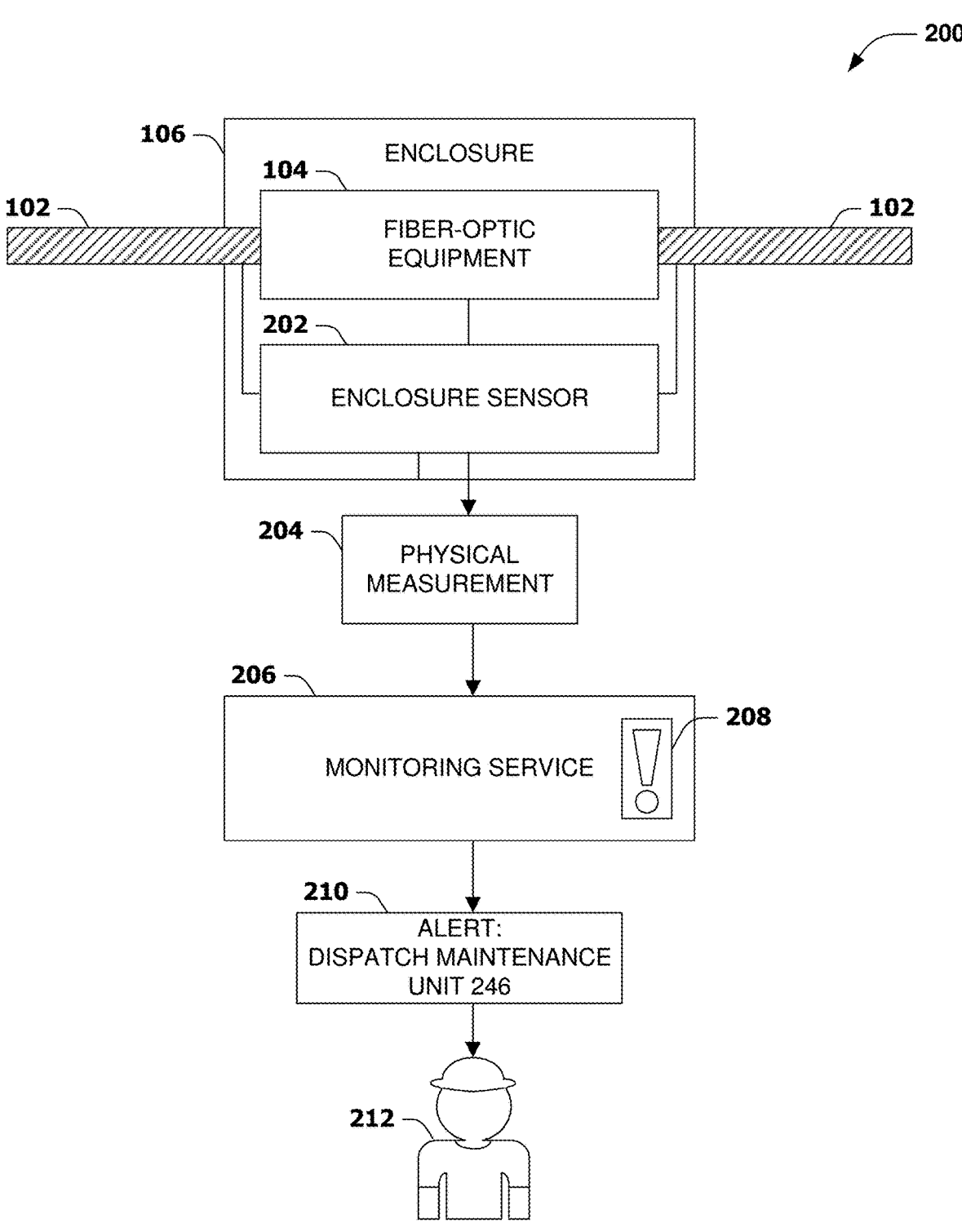
FIG. 2 is an illustration of an example scenario featuring an enclosure sensor that measures a physical measurement of a physical property of an enclosure of fiber-optic equipment and a monitoring service that transmits an alert to maintenance personnel responsive to the physical measurement, in accordance with the techniques presented herein.

FIG. 2 is an illustration of an example scenario 200 featuring techniques for promoting the monitoring and/or diagnosis of fiber-optic equipment 104. In accordance with this disclosure, an enclosure sensor 202 is provided within the enclosure 106 that detects one or more physical measurements 204 of the enclosure 106, such as the temperature, pressure, moisture such as humidity, motion, orientation, vibration, and/or light level within the enclosure 106. The enclosure sensor 202 may conduct the physical measurement 204 continuously, periodically, and/or in response to an event (e.g., a moisture detector may detect the presence of moisture above a certain threshold, triggering a moisture sensor 202 to measure the amount of moisture). Messages that include, describe, and/or report information based upon the physical measurements 204 may be transmitted to a monitoring service 206. If such messages indicate a potential problem 208, such as temperature extremes, the presence of moisture, or unexpected or excessive motion or vibration, the monitoring service 206 may transmit an alert 210 to maintenance personnel 212 that describes the potential problem 208 and identifies the enclosure 106, thus enabling the maintenance personnel 212 to address the potential problem 208 such as through inspection, testing, repair, and/or replacement of the fiber-optic cable 102, the fiber-optic equipment 104, the enclosure 106, and/or the enclosure sensor 202. Such techniques, alone or in combination with other techniques (e.g., transmission performance monitoring and periodic inspection and testing), may provide a comprehensive maintenance regimen that detects a wide variety of potential faults, and that enables a greater degree of proactive maintenance to preserve communication service, in accordance with the techniques presented herein.

Figure 3:
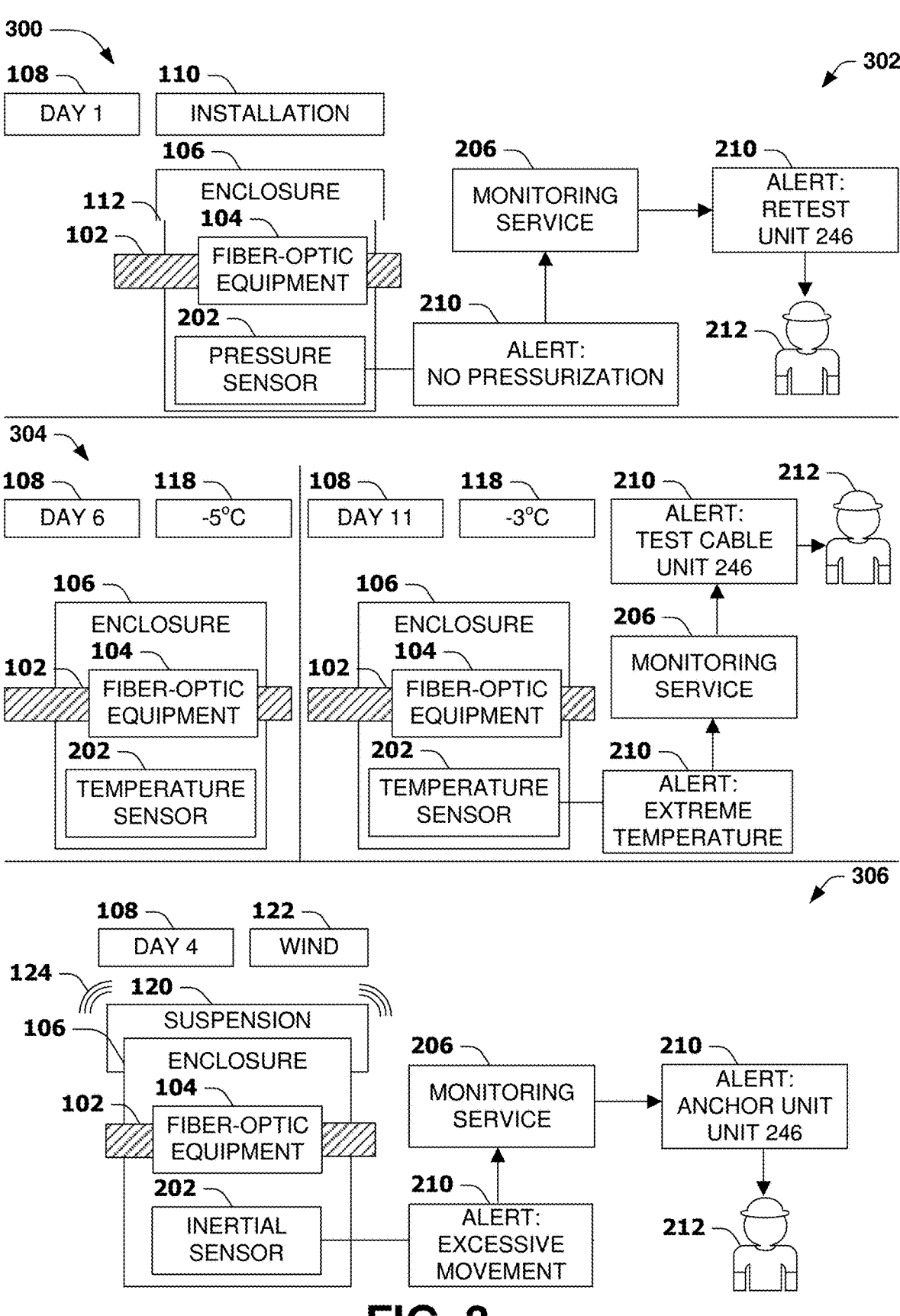
FIG. 3 is an illustration of an example scenario featuring scenarios for maintaining fiber-optic equipment for a fiber-optic cable, in accordance with the techniques presented herein.

FIG. 3 is an illustration of a set 300 of example scenarios in which the techniques presented herein may facilitate proactive maintenance.

In a first example scenario 302, the installation 110 of the fiber-optic equipment 104 and enclosure 106 during a deployment on a particular day 108 may be assisted by flash-testing, in which maintenance personnel 212 increase the pressure within the sealed enclosure 106 to detect leaks. In accordance with the techniques presented herein, the enclosure 106 may be equipped with a pressure sensor 202 that detects air pressure within the enclosure 106, which is expected to rise during flash-testing. However, due a gap 112 in the enclosure 106, a seal has not been established, and no pressurization may be detected by the pressure sensor 202. As a result, an alert 210 may be transmitted to a monitoring service 206 describing a lack of pressurization that denotes a failure of the flash testing. While the cause of the failure may be unknown (e.g., maintenance personnel 212 may have omitted the flash-test; the maintenance personnel 212 may have failed to seal the enclosure 106, or may have performed the flash test incorrectly; or the enclosure 106 may contain a defect that prevents sealing), the detection of the lack of pressurization may prompt the monitoring service 206 to transmit the alert 210 to maintenance personnel 212 on-site during the installation 110, enabling the maintenance personnel 212 to retest, inspect, and/or replace the enclosure 106 to promote sealing through the use of the techniques presented herein.

In a second example scenario 304, extreme temperatures 118 for an extended period of time may cause problems such as temperature-induced cable loss (TICL), but determining the degree to which any particular set of fiber-optic cable 102, fiber-optic equipment 104, and/or enclosure 106 have been exposed to temperatures 118 outside of an acceptable range (e.g., the magnitude of the temperature 118 within the enclosure 106 compared with an acceptable range, and/or the duration of such temperatures 118) may enable a more specific status estimation. In accordance with the techniques presented herein, the enclosure 106 may be equipped with a temperature sensor 202 that monitors the temperature inside, outside, and/or in the vicinity of the enclosure 106, and to which the fiber-optic cable 102, fiber-optic equipment 104, and/or enclosure 106 may be exposed. The monitoring of temperature 118 by the temperature sensor 202 enables a determination that temperature-induced cable loss may be imminent and/or likely, even if the fiber-optic cable 102 and/or fiber-optic equipment 104 exhibit acceptable performance Accordingly, an alert 210 may be transmitted to a monitoring service 206 that reports on the temperature 118. Again, the cause of the failure may be unknown (e.g., excessively high temperature may be caused by continued exposure to direct sunlight, mounting of the enclosure 106 near a heat source, excess insulation that reduces venting, excessive heat production by the fiber-optic equipment 104, and/or poor airflow within the enclosure 106), and such reporting may not affirmatively advise the monitoring service 206 that TICL has been induced or that communication outages are imminent. However, this detection may enable a timely determination of potential TICL prior to its detection in cable performance, enabling an alert 210 to be dispatched to maintenance personnel 212 to test the cable for signs of TICL through the use of the techniques presented herein.

In a third such scenario 306, the enclosure 106 may be deployed in a suspension 120 that, due to inadequate anchoring or a partial failure of mounting, causes movement 124 when the enclosure 106 is subjected to wind 122. In accordance with the present disclosure, an inertial sensor 202 provided in the enclosure 106 may detect the movement 124, resulting in an alert 210 to a monitoring service 206, which may notify maintenance personnel 212 of the necessity of establishing or reestablishing anchoring of the enclosure 106 to the suspension 120 to reduce the movement 124. This detection may enable a proactive detection of the problem and a proactive repair of the enclosure 106 in a manner that reduces the incidence of a complete failure of the suspension 120 resulting in a communication outage 116 through the use of the techniques presented herein.

C. Technical Effects

The use of the techniques presented herein may provide a variety of technical effects.

A first technical effect that may be achievable through the use of the techniques presented herein involves a proactive detection of physical measurements 204 that indicate the physical conditions of the fiber-optic equipment 104 and/or the enclosure 106 that, if undetected (such as by maintenance techniques that only utilize performance monitoring and testing), might result in a sudden and/or unexpected communication outage 116. Accordingly, the use of the techniques presented herein to monitor such physical conditions may promote the continuous provision of communication service.

A second technical effect that may be achievable through the use of the techniques presented herein involves efficiency gains in the maintenance of a fiber-optic network. As a first such example, the detection, transmission, evaluation, and action upon physical measurements 204 of fiber-optic equipment 104 within enclosures 106 may enable preventive measures that are potentially less costly and easier to implement than repairs undertaken after a communication outage 116, and/or may provide informative diagnostic information that indicates a cause of a communication outage 116, thereby alleviating maintenance personnel 212 from performing hands-on testing and inspection, as well as reviewing such information to reach the same diagnosis. For example, applying anchoring or vibration damping to maintain a suspension 120 of an enclosure 106 in an aerial deployment is likely to be more cost-effective than replacing an entire enclosure 106 and severed cable 102 as a result of a failure of the suspension 120 and a damaging fall. As a second such example, the use of the techniques presented herein may reduce false negatives (e.g., a conclusion that fiber-optic equipment 104 has not been subjected to extreme temperatures 118 and is therefore not subject to TICL, when actual circumstances of the enclosure 106 have failed to protect the fiber-optic equipment 104). As a third such example, the use of the techniques presented herein may reduce false positives (e.g., where the enclosure 106 has adequately protected the fiber-optic equipment 104 from damaging conditions and has preserved the reliability and continued service of the fiber-optic equipment 104, but where a conclusion that fiber-optic equipment 104 has been compromised may lead to an unnecessary replacement of fiber-optic equipment 104 and/or enclosures 106).

A third technical effect that may be achievable through the use of the techniques presented herein involves an automated detection and reporting of the physical conditions of the fiber-optic equipment 104 and the enclosure 106. Such automated detection and reporting may reduce the reliance upon active inspection and testing by maintenance personnel 212, which may be costly (e.g., if the number of deployments of fiber-optic equipment 104 is large), delayed (e.g., if the enclosure 106 is deployed in a remote location that is difficult to access), and/or hazardous (e.g., if the enclosure 106 is deployed in a location that is potentially dangerous to maintenance personnel 212). Such automated detection and reporting may also enable a monitoring service 206 to assess the magnitudes and relative priorities of various potential problems 208, thereby enabling a realtime prioritization based on such properties as efficiency, cost, timeliness, and numbers of customers who may be inconvenienced by a communication outage 116, rather than depending upon maintenance personnel 212 and dispatchers from speculating about maintenance priorities without a clear, fully detailed understanding of the status of the fiber-optic equipment 104 within each enclosure 106. Many such technical effects may be achievable through the use of the techniques presented herein.

D. Example Embodiments

Figure 4:
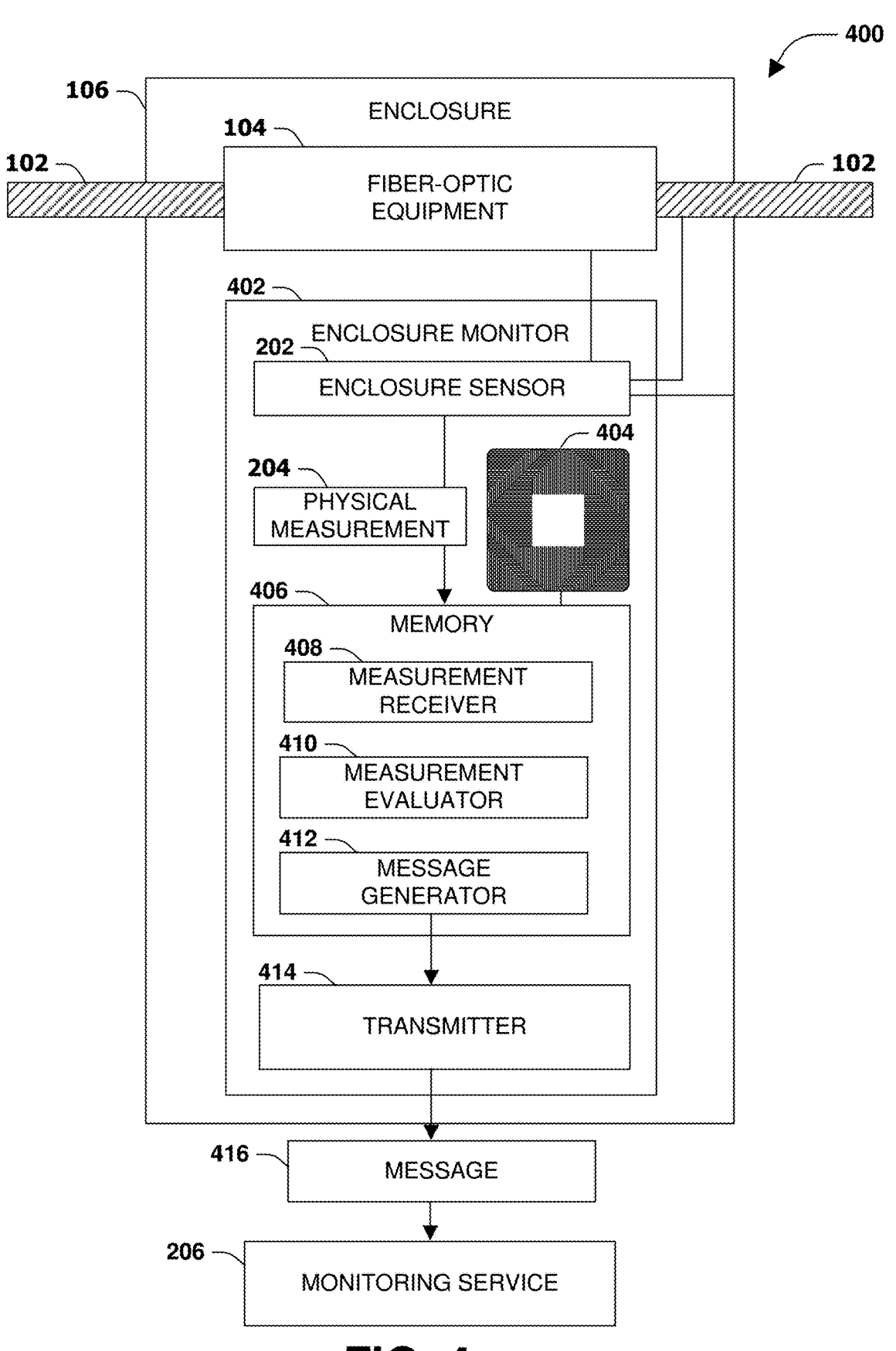
FIG. 4 is an illustration of an example scenario featuring some example embodiments of an enclosure monitor of fiber-optic equipment in accordance with the techniques presented herein.

FIG. 4 is an illustration of an example scenario 400 featuring a few example embodiments of the techniques presented herein. In this example scenario 400, fiber-optic equipment 104 of a fiber-optic cable 102 is housed by an enclosure 106, which is often sealed to protect the fiber-optic equipment 104, e.g., from the environment and unauthorized access by humans. The enclosure 106 of the fiber-optic equipment 104 further comprises an enclosure monitor 402 that monitors the enclosure 106 and reports physical status information to a monitoring service 206. In some embodiments, the enclosure monitor 402 may be deployed with, and optionally integrated with, the enclosure 106; in other embodiments, the enclosure monitor 402 may comprise a supplemental package that may be added to a previously deployed enclosure 106.

The enclosure monitor 402 further comprises an enclosure sensor 202 enclosure sensor that measures a physical measurement 204 of a physical property of the enclosure 106, such as temperature within the sealed compartment comprising the enclosure 106; air pressure within the enclosure 106; and/or the presence of moisture, such as humidity or liquid water, within the enclosure 106. The enclosure monitor 402 further comprises a processor 404 and a memory 406 that stores components of a system that processes the physical measurement 204, wherein the system further comprises a measurement receiver 408 that receives the physical measurement 204 from the enclosure sensor 202 (e.g., a sensor controller); a measurement evaluator 410 that evaluates the physical measurement 204 that evaluates the physical measurement 204 (e.g., comparing the physical measurement 204 to a predicted value or a nominal threshold); and a message generator 412 that generates a message 416 about the physical measurement 204 (e.g., an alert that describes a potential problem indicated by the physical measurement 204). The enclosure monitor 402 further comprises a transmitter 414 that transmits, to the monitoring service 206, the message 416 about the physical measurement 204 of the physical property of the enclosure 106. In this manner, the example enclosure monitor 402 facilitates the maintenance of the fiber-optic cable 102, the fiber-optic equipment 104, and the enclosure 106 in accordance with the techniques presented herein.

Figure 5A:
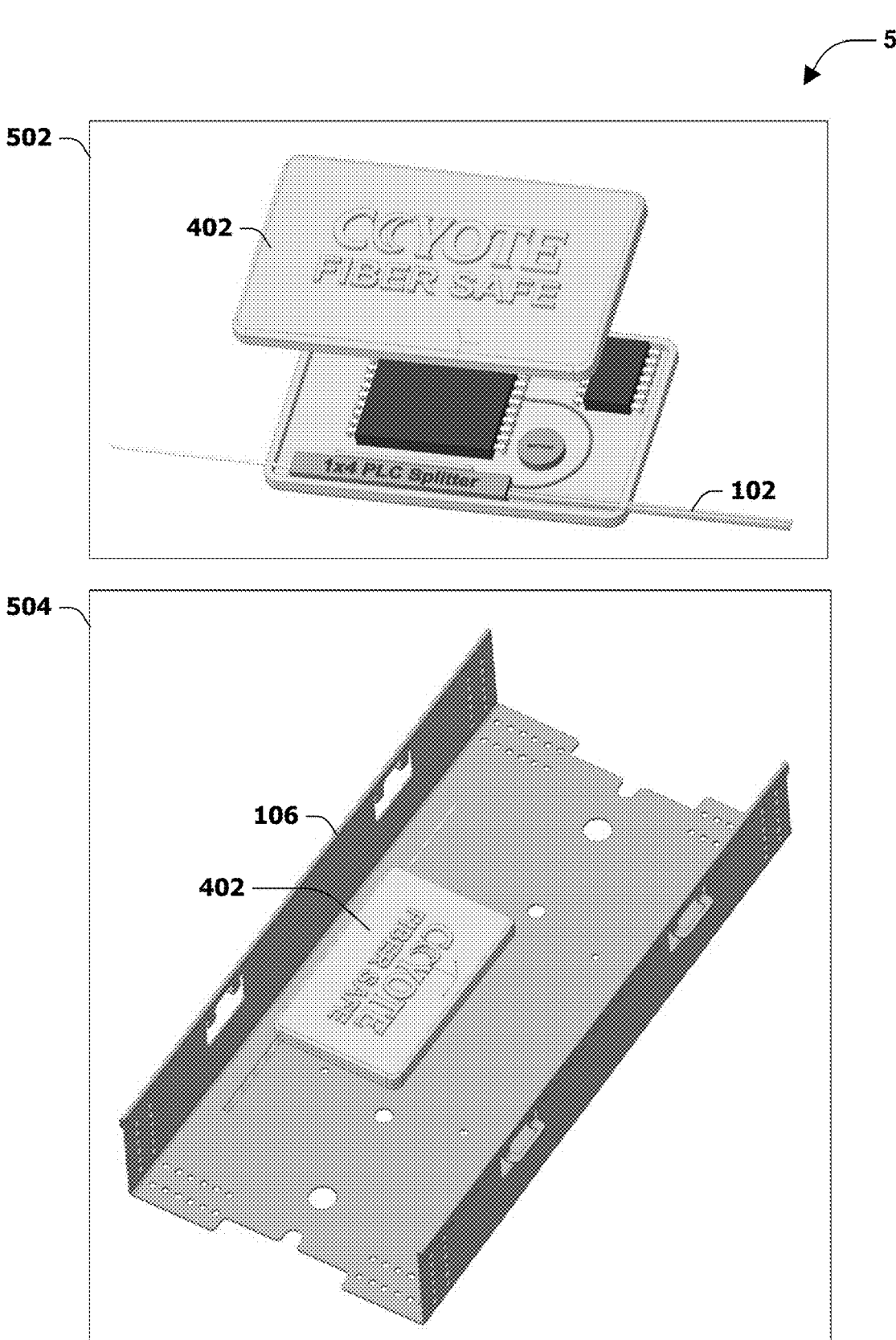
FIGS. 5A-5B are illustrations of example depictions of an enclosure sensor of an enclosure of fiber-optic equipment in accordance with the techniques presented herein.
Figure 5B:
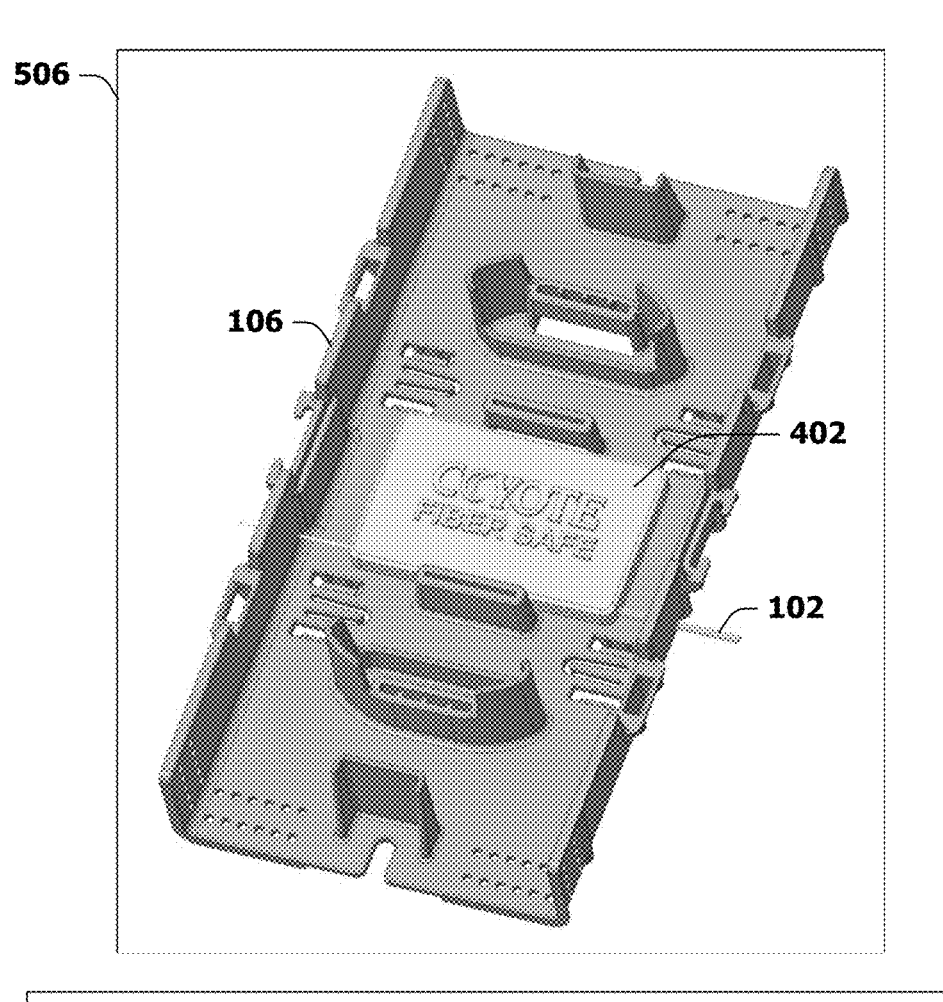
Figure 5B:
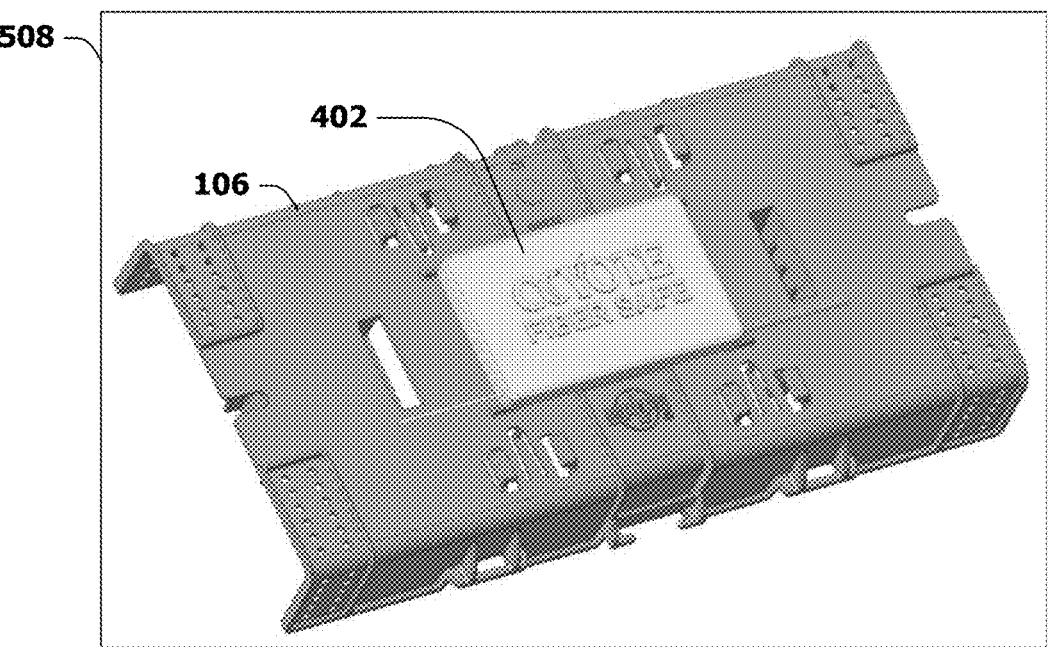

FIGS. 5A-5B present a set 500 of illustrations of example enclosures 106 and enclosure monitors 402 that may deployed thereto to facilitate the monitoring of fiber-optic equipment 104 for a fiber-optic cable 102. In a first example 502, the fiber-optic equipment may be monitored by an enclosure monitor 402 that performs physical measurements 204 of an enclosure of fiber-optic equipment 104, and that uses the fiber-optic cable 102 to transmit messages about the physical measurements to a monitoring service 206. In a second example 504, the enclosure monitor 402 may be mounted inside the enclosure 106 (e.g., affixed to an interior surface of the enclosure 106) to perform measurements using one or more enclosure sensors 202 embedded in the enclosure monitor 402. In a third example 506, the enclosure monitor 402 may be deployed within of the enclosure 106 by use of mounting members that are positioned within the enclosure 106 that are selected and arranged therefor, thus enabling the enclosure monitor 402 to be rigidly affixed to the interior surface of the enclosure 106. In a fourth example 508, the enclosure monitor 402 is affixed to an exterior surface of the enclosure 106, and may utilize enclosure sensors 202 that perform physical measurements 204 of physical properties within the enclosure 106 (e.g., enclosure sensors 202 that are deployed within the enclosure 106 and that communicate wirelessly with the enclosure monitor 402 mounted to the exterior, or that utilize an electrical connection to transmit and receive physical measurements 204 through the enclosure 106). Many such configurations of the enclosure 106 and enclosure sensor 202 may be devised and applied in accordance with the techniques presented herein.

Figure 6:
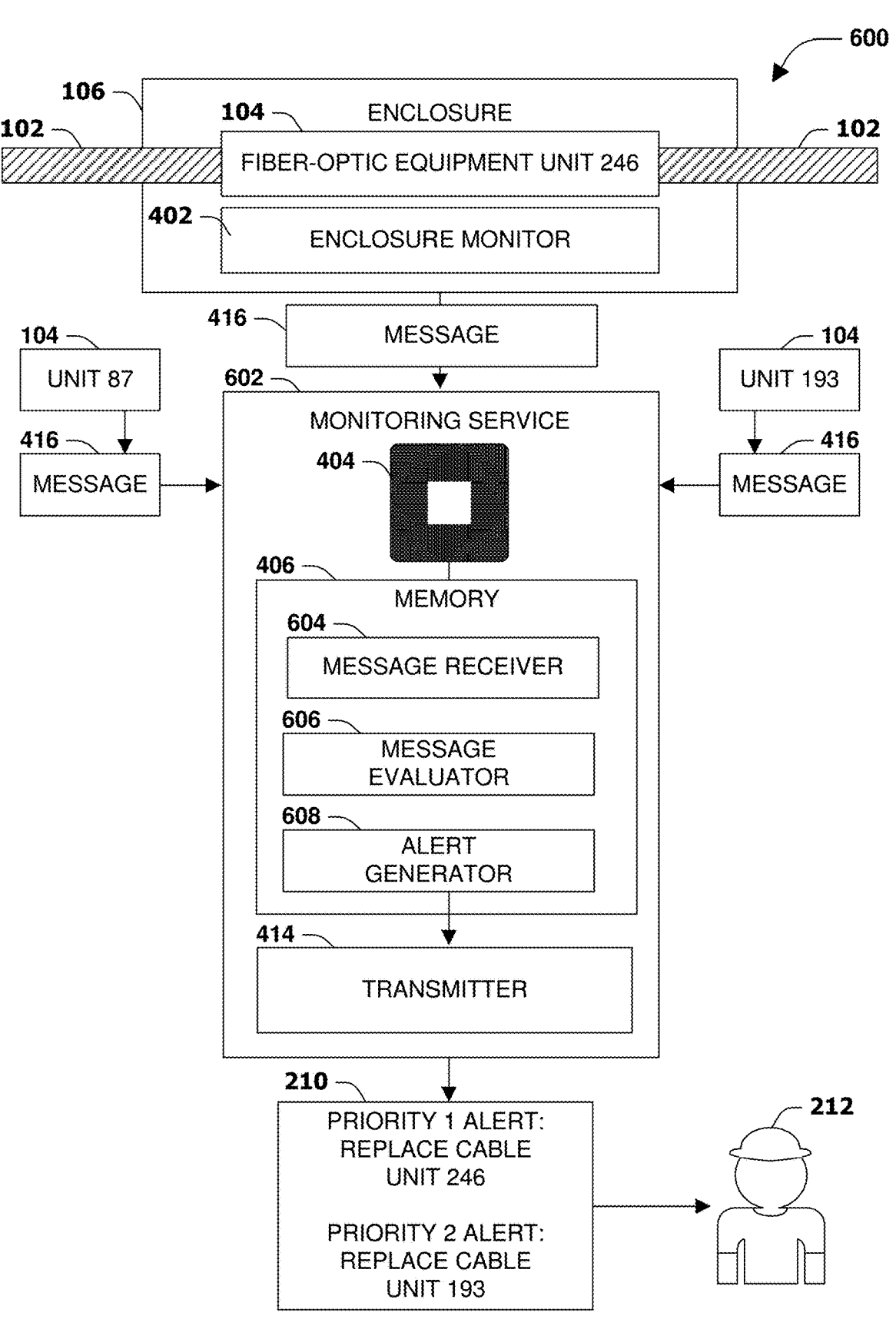
FIG. 6 is an illustration of an example scenario featuring some example embodiments of a monitoring service of a fiber-optic network in accordance with the techniques presented herein.

FIG. 6 is an illustration of an example scenario 600 featuring other example embodiments of the techniques presented herein. In this example scenario 600, an enclosure 106 of fiber-optic equipment 104 of a fiber-optic cable 102 may be monitored by an enclosure monitor 402 that transmits messages 416 about physical measurements 204 within the enclosure 106. A monitoring service 602 receives the messages 416 from the enclosure monitor 402, as well as messages 416 about physical measurements within the enclosure 106 of other deployments of fiber-optic equipment 104 that are also monitored by enclosure monitors 402. The monitoring service 602 utilizes the messages 416 about the physical measurements 204 received from the enclosure monitors 402 to facilitate the maintenance of the fiber-optic equipment 104 and the fiber-optic network in the following manner. The monitoring service 206 comprises a server having a processor 404 and a memory 406 storing instructions that, when executed by the processor 404, cause the device to formulate a system that evaluate the messages 416 in the following manner. The system further comprises a message receiver 604 that receives, from respective enclosure monitors 402, a message 416 about a physical measurement 204 of a physical property within an enclosure 106 that has been detected by an enclosure sensor 202 of the enclosure monitor 402. The system further comprise a message evaluator 606 that evaluates the message 416 about the physical measurement 204 to identify a potential problem 208 with at least one deployment of fiber-optic equipment 104. The system also comprises an alert generator 412 that generates an alert 210 about the potential problem 208, such as an identifier of the fiber-optic equipment 104 deployed within the enclosure 106, and a maintenance task to apply to the fiber-optic equipment 104 deployed within the enclosure 106 to remediate the potential problem 208 (e.g., inspecting, testing, and/or replacing the fiber-optic equipment 104, the fiber-optic cable 102, the enclosure 106, and/or the enclosure monitor 402). The monitoring service 602 also comprises a transmitter 414 that transmits the alert 210 to selected maintenance personnel 212 to perform the task. In this manner, the monitoring service 206 may utilize the messages 416 received from the enclosure monitors 402 about the physical conditions of the fiber-optic equipment 104 within the enclosures 106 to facilitate maintenance of the fiber-optic network in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example enclosure 106 and/ or enclosure monitor 402 of FIG. 4; the example system created within the memory 406 of the enclosure monitor 402 of FIG. 4; any of the example embodiments of enclosures 106 and/or enclosure monitors 402 shown in FIGS. 5A-5B; the example monitoring service 602 of FIG. 6; and/or the example system created in the memory 406 of the example monitoring service 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized with a variety of fiber-optic networks and components. As a first such example, the techniques presented herein may be utilized with fiber-optic equipment 104 for various types of fiber-optic cables 102, including fiber-optic cables that carry various kinds of data (e.g., voice, video, and/or network communication) in various configurations (e.g., a variety of network topologies, such as a centralized organization in the manner of cable television networks, or a peer-based organization in the manner of a computer network). The fiber-optic cables 102 may communicate using any wavelength of light, and may be single-mode, multi-mode, ribbon-fiber, etc. The fiber-optic cables 102 may also be connectorized and/or fusion-spliced using various techniques. Without limitation, the term "fiber-optic cable" 102 may include any of the following: ADSS (all-dielectric self-supporting); OPGW (optical ground wire); shielded cable; dielectric cable; plenum cable; riser cable; bend-insensitive cable; rollable cable; and drop cable. As a second such example, the techniques presented herein may be applied to many types of fiber-optic equipment 104 (e.g., hubs, converters, switches, repeaters, and fiber-optic splices). As a third such example, the techniques presented herein may be applied to many types of enclosures 106, and to enclosures 106 deployed in a variety of locations (e.g., indoors vs. outdoors; at ground level, above ground, or below ground; and in a public or private area). It is to be noted that the term "enclosure" as used herein refers generally to a housing for fiber-optic equipment 104, whether such housing and/or fiber-optic equipment 104 are deployed to an outdoor location (sometimes referred to simply a "closure") and/or an indoor location (frequently identified as an "enclosure"), including a variety of other such scenarios, including deployment in space and deployment on a mobile platform such as a vehicle. Any such housing of fiber-optic equipment 104 is anticipated to be included in term "enclosure" 106. Many such types of fiber-optic cables 102, fiber-optic equipment 104, and enclosures 106 may be utilized in the techniques presented herein.

As a second variation of this first aspect, the techniques presented herein may be implemented in various architectural configurations. As a first such example, the enclosure 106, fiber-optic equipment 104, and enclosure monitor 402 may be manufactured and deployed together, or may be provided as two or more separate components that are functionally coupled during or after deployment, such as an add-on enclosure monitor 402 that is added to an existing deployment of fiber-optic equipment 104. As a second such example, the enclosure monitor 402 may comprise a single unit, or a collection of two or more distinct units (e.g., an enclosure sensor 202 that is deployed within the enclosure 106 and a processing unit, including a transmitter 414, that is deployed outside the enclosure 106 and that communicates with the enclosure sensor 202 using wired and/or wireless communication). Alternatively, one or more enclosure sensors 202 may be affixed to an exterior of the enclosure 106, or even at a marginal distance from the enclosure 106, that measure physical measurements that may also relate to the interior of the enclosure 106, such as measurements of the exterior of the enclosure 106 or the air temperature of the air surrounding the enclosure 106. As a third such example, the enclosure monitor 402 may comprise a processor 404 and a memory 406 storing instructions that, when executed by the processor 404, formulate the components of a system. Alternatively, one or more elements of the enclosure monitor 402 may be implemented as a collection of discrete components in the absence of a processor 404, such as a signal processing circuit.

As a third variation of this first aspect, the enclosure monitor(s) 402, monitoring service 602, and maintenance personnel 212 may be organized and may communicate in various ways. As a first such example, the enclosure monitor 402 may communicate with the monitoring service 602 in a direct manner (e.g., via a direct wired or wireless connection therebetween); in an organized hierarchical organization (e.g., an arrangement of enclosure monitors 402 that relay and direct data to and from the monitoring service 602); and/or a decentralized peer-to-peer or proxy organization (e.g., a self-organizing mesh of enclosure monitors 402 that automatically generate and maintain routing paths to and from the monitoring service 602). Still other organizational models are available (e.g., enclosure monitors 402 may include a wired or wireless connection to a computer network such as the internet, and may exchange data with the monitoring service 602 via the network). As a second such example, the monitoring service 602 may comprise a single service, such as a centralized data processing location for a region, or a collection of monitoring services 602 that interoperate in various organizational configurations (e.g., a large-scale deployment of a fiber-optic network may involve a variety of geographically distributed monitoring service 602 that share information thereamong). As a third such example, the monitoring service 602 may communicate with maintenance personnel 212 using a variety of techniques, including cellular communication, WiFi communication, radiofrequency broadcast, and directly loading information to devices carried by the network personnel 212. Alternatively or additionally, maintenance personnel 212 may directly communicate with enclosure monitors 402, e.g., by localized transmission using low-power AM/FM, RFID, Bluetooth, or WiFi, to facilitate local maintenance without depending entirely upon communication with the monitoring service 602 (which may be advantageous, e.g., for maintenance involving remote and/or distant deployments of fiber-optic equipment 104 where communication with the monitoring service 602 may be unavailable and/or undependable). Generalized broadcast techniques (e.g., low-power FM broadcast) may also be utilized, and may be advantageous, e.g., for assisting maintenance personnel 212 in the absence of specialized equipment, since such broadcasts may be locally received via widely available equipment such as an FM radio. Many such configurations of such components may be selected and utilized to implement the techniques presented herein.

E2. Enclosure Sensors and Physical Measurements

A second aspect that may vary among embodiments of these techniques relates to the enclosure sensors 202 that measure various physical measurements 204 within an enclosure 106.

As a first variation of this second aspect, the enclosure sensor 202 may comprise a temperature sensor that measures a temperature within the enclosure 106. Such temperature may result from a combination of the regional climate, the local ambient environment (e.g., the temperature within a shed housing the enclosure 106), the fiber-optic equipment 104, and other causes such as fire. The enclosure monitor 402 may use the temperature sensor to measure the temperature, and may generate and send messages 416 comprising a warning of potential temperature-induced cable loss arising from the temperature within the enclosure 106.

As a second variation of this second aspect, the enclosure sensor 202 may comprise a light level sensor that measures a light level within the enclosure 106. The enclosure monitor 402 may evaluate the light level measurements within the enclosure 106 and, responsive to detecting high light-level measurements, may generate and transmit messages 416 that provide a warning of a breach of the enclosure 106. Such breach may occur due to accidents (e.g., a collision that damages the enclosure 106), intrusion by animals, tampering by humans, or maintenance procedural failures (e.g., a failure to seal and secure the enclosure 106 after completing maintenance).

As a third variation of this second aspect, the enclosure sensor 202 may comprise an inertial sensor that measures movement of the enclosure 106, such as swaying, vibration, or displacement. The enclosure monitor 402 may evaluate the movement information generated by the inertial sensor, and generate and transmit messages 416 comprising a warning of excessive movement of the enclosure 106, optionally describing the movement of the enclosure 106 to a new orientation and/or location (e.g., reporting geocoordinates as the enclosure 106 moves from a first location to a second location).

As a fourth variation of this second aspect, the enclosure sensor 202 may comprise a pressure sensor that measures pressure within the enclosure 106 during a flash-testing of the enclosure 106 (e.g., a pressurization and/or depressurization of the enclosure 106 to detect leaks that verify sealing or demonstrate leaks). The enclosure monitor 402 may receive and evaluate pressure measurements during flash-testing (e.g., where a failure to exhibit or maintain pressurization and/or depressurization indicates a failure of the seal of the enclosure 106), and may generate and send messages 416 comprising a warning that the pressure measured within the enclosure 106 during the flash-testing indicates a flash-test failure.

Various other enclosure sensors 202 may be included in an enclosure monitor 402 that measure various other physical properties. Such enclosure sensors 202 may include, e.g., moisture sensors that measure a moisture level within the enclosure 106; orientation sensors that measure an orientation of the enclosure 106 relative to a reference orientation; motion sensors that measures motion of the enclosure 106; vibration sensors that measure vibration of the enclosure 106; location sensors that measure a location of the enclosure 106; and grounding sensors that measure grounding of the fiber-optic equipment 104.

As a fifth variation of this second aspect, physical measurements 204 may be measured on an approximately continuously basis, such as a very high frequency that is limited only by the signal processing capabilities of the enclosure monitor 402. Alternatively, physical measurements 204 may be measurements on a periodic basis. For example, the enclosure 106 may further comprise a power supply with a limited power capacity that powers the enclosure monitor 402, such as a battery. The enclosure sensor 202 may measure the physical measurement 204 at a periodicity that conserves the limited power capacity, such as once per hour. As another alternative, the enclosure sensor 202 may detect physical measurements 204 upon a triggering event (e.g., a simple moisture sensor may be activated by the presence of moisture above a threshold, which may activate a moisture measurement sensor to measure the moisture level for assessment of the magnitude of the potential problem 208). As yet another alternative, the enclosure sensor 202 may detect physical measurements 204 on request, e.g., responsive to a signal from the monitoring service 206 indicating a command to perform a physical measurement 204. Many such techniques may be utilized to gather physical measurements 204 of the physical state of the enclosure 106 in accordance with the techniques presented herein.

E3. Message Transmission Physical Measurements

A third aspect that may vary among embodiments of these techniques relates to the transmission of messages 416 about the physical measurements 204 within the enclosure 106 to a monitoring service 206.

Figure 7:
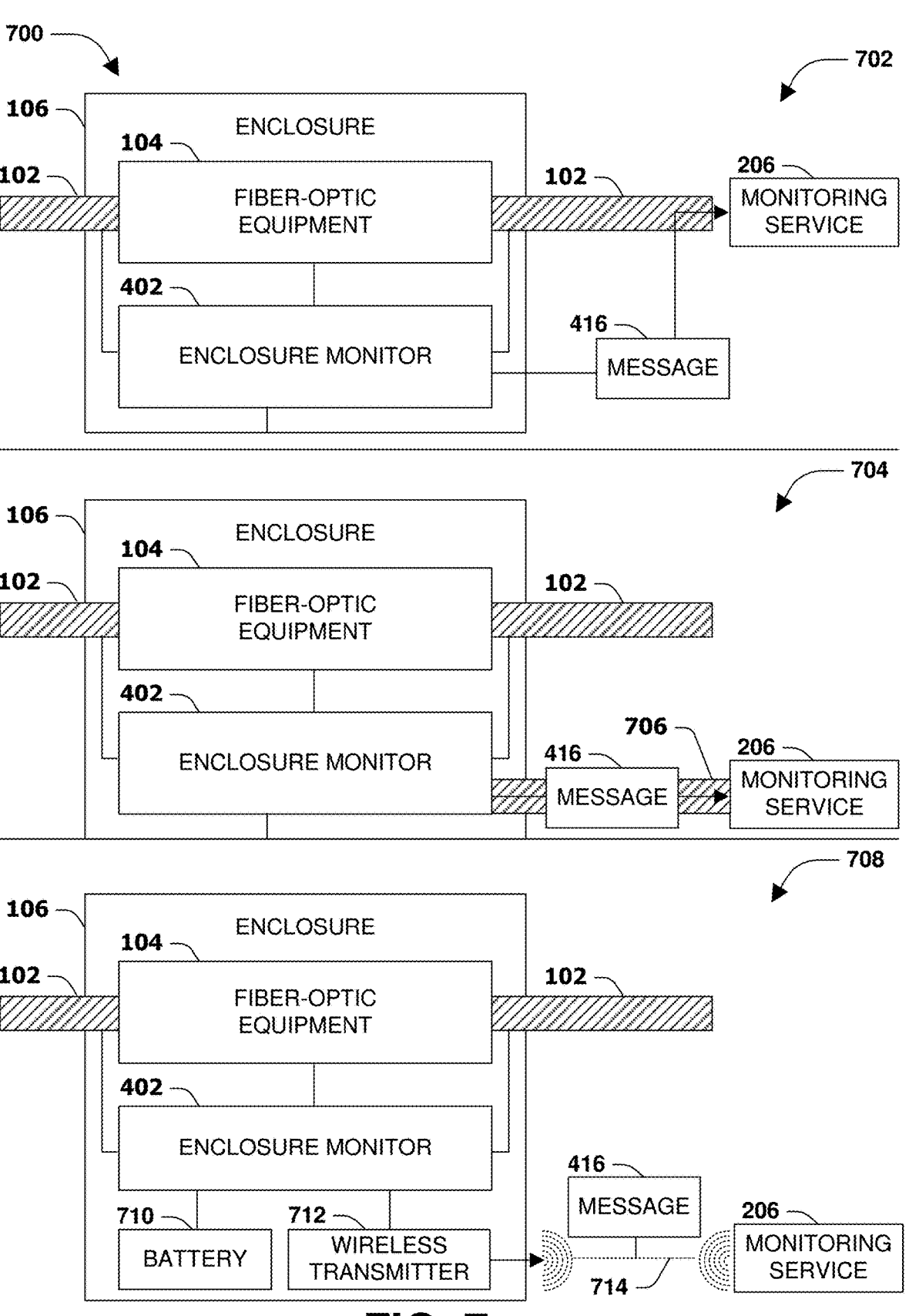
FIG. 7 is an illustration of example scenarios featuring some examples of an enclosure sensor of an enclosure of fiber-optic equipment in accordance with the techniques presented herein.

FIG. 7 is an illustration of a set 700 of example scenarios in which messages 416 are transmitted to a monitoring service according to a first variation of this third aspect. In a first example scenario 702, the enclosure sensor 202 receives physical measurements 204 of physical properties of the enclosure 106 and transmits messages 416 about the physical measurements 204 using a monitoring service 206, which may be advantageous, e.g., for preserving equipment and/or maintenance costs. Alternatively, the enclosure monitor 402 may have access to a dedicated reporting communication channel that is separate from the fiber-optic cable 102 and that is dedicated and/or reserved for reporting physical measurements 204 and delivering messages 416 to the monitoring service 206, which may enable the enclosure monitor 402 to send messages 416 to the monitoring service 206 even in the event of a complete failure of the fiber-optic cable 102 and/or fiber-optic equipment 104. In a second example scenario 704, the fiber-optic equipment 104 services a first fiber-optic cable 102, and the enclosure monitor 402 may utilize a second fiber-optic cable 706 to transmit messages 416 to the monitoring service 206. The second fiber-optic cable 706. As a third example 708, the enclosure 106 may comprise a wireless transmitter 712, such as a cellular transceiver, an RF broadcaster, or a Bluetooth or WiFi adapter, and the enclosure monitor 402 may transmit messages 416 to the monitoring service 206 via a wireless communication channel 714 such as a selected frequency band of the electromagnetic spectrum. It may be advantageous for configuring the wireless transmitter 712 to transmit only periodically and/or upon detecting a potential problem 208 if the enclosure 106 is powered by a battery 710 featuring a limited power capacity.

As a second variation of this third aspect, messages 416 may be generated and/or transmitted on an approximately continuously basis, and/or on a periodic basis. Fir example, the enclosure 106 may further comprise a power supply with a limited power capacity that powers the enclosure monitor 402, such as a battery 710. The transmitter 414 may transmit messages 416 to the monitoring service 206 at a periodicity that conserves the limited power capacity, such as once per day. The transmitter 414 may transmit messages 416 upon a triggering event (e.g., only transmitting messages 416 that indicate a potential problem 208, or transmitting such messages 416 more promptly than messages 416 indicating no potential problem 208). As yet another alternative, the transmitter 414 may transmit messages 416 on request, e.g., responsive to a signal from the monitoring service 206 indicating a command to transmit messages 416 describing one or more physical measurements 204 of the enclosure 106.

As a third variation of this third aspect, the transmitter 414 may transmit messages 416 using the same timing and/or triggering to transmit messages 416 as the enclosure sensor 202 uses to measure the physical measurements 204. For example, the enclosure sensor 202 and the transmitter 414 may use the same periodicity, such that messages 416 are promptly transmitted after generation of the physical measurement 204 by the enclosure sensor 202. Alternatively, the enclosure sensor 202 and the transmitter 414 may utilize a different periodicity and/or triggering event; e.g., the enclosure sensor 202 may measure physical measurements 204 over a relatively short period (such as once per hour), and the transmitter 414 may enqueue messages 416 over the period, optionally with date- and/or timestamps. At a relatively longer period (such as once per day), the transmitter 414 may transmit the queue of messages 416 to the monitoring service 206 in a batch, thereby potentially conserving power as compared with transmitting individual messages 416. As a still further variation, the enclosure sensor 202 may continuously and/or periodically generate physical measurements 204, and the transmitter 414 may generate and transmit messages 416 only if the physical measurement 204 indicates a potential problem 208 with the fiber-optic cable 102, the fiber-optic equipment 104, and/or the enclosure 106.

As a fourth variation of this third aspect, the contents of the message 416 may provide only the raw data output of the enclosure sensor 202, such as one more physical measurements 204 (optionally organized as a sequence and/or including a timestamp). Alternatively or additionally, an enclosure monitor 402 may perform a comparison of the physical measurement 204 with a reference value, and the messages 416 transmitted by the transmitter 414 may describe the comparison. As a first such example, the reference value may comprise a historical average of the physical measurement 204 (e.g., past data collected from the same enclosure monitor 402 or other enclosure monitors 402 in similarly situated enclosures 106). As a second such example, the reference value may comprise an expectation of the physical measurement 204 (e.g., a typical, theoretical, expected, and/or threshold measurement value). Alternatively or additionally, the messages 416 may describe a potential problem 208 with the fiber-optic cable 102, the fiber-optic equipment 104, and/or the enclosure 106 that may be indicated by the physical measurement 204 and/or the rationale for identifying the physical measurement 204 as a potential problem 208 (e.g., the reference value against which the physical measurement 204 was compared, and/or a series of physical measurements 204 demonstrating a trend). The messages may also include other information, such as performance measurements of a performance of the fiber-optic cable 102; performance measurements of a performance of the fiber-optic equipment 104; model information of the fiber-optic equipment 104; a deployment and/or maintenance history of the fiber-optic cable 102, the fiber-optic equipment 104, the enclosure 106, and/or the enclosure monitor 402; and/or power status information about a power supply of the enclosure monitor 402, such as battery capacity of a battery 710.

As a fifth variation of this third aspect, the transmitter 414 may transmit messages 416 directly to a monitoring service 206. Alternatively or additionally, the transmitter 414 may transmit messages 416 to a monitoring service 206 indirectly, e.g., via a proxy or gateway. As yet another alternative or additional technique, the transmitter 414 may store messages 416 until receiving a connection from a data store that relays messages 416 to the monitoring service 206, which may be advantageous, e.g., for remote deployments with only limited communication capability to reach the monitoring service 206. As yet another alternative or additional technique, the transmitter 414 may transmit messages 416 to a device of maintenance personnel 212, e.g., via Bluetooth to a mobile computing device and/or via RF broadcast for presentation by an AM or FM radio. Many such techniques may be utilized to transmit messages 416 involving the physical measurements 204 in accordance with the techniques presented herein.

E4. Uses of Physical Measurements

A fourth aspect that may vary among embodiments of these techniques relates to the use of messages 416 about the physical measurements 204 within the enclosure 106 by the monitoring service 206 and/or maintenance personnel 212 to facilitate the maintenance of the fiber-optic equipment 104 and the fiber-optic network.

Figure 8:
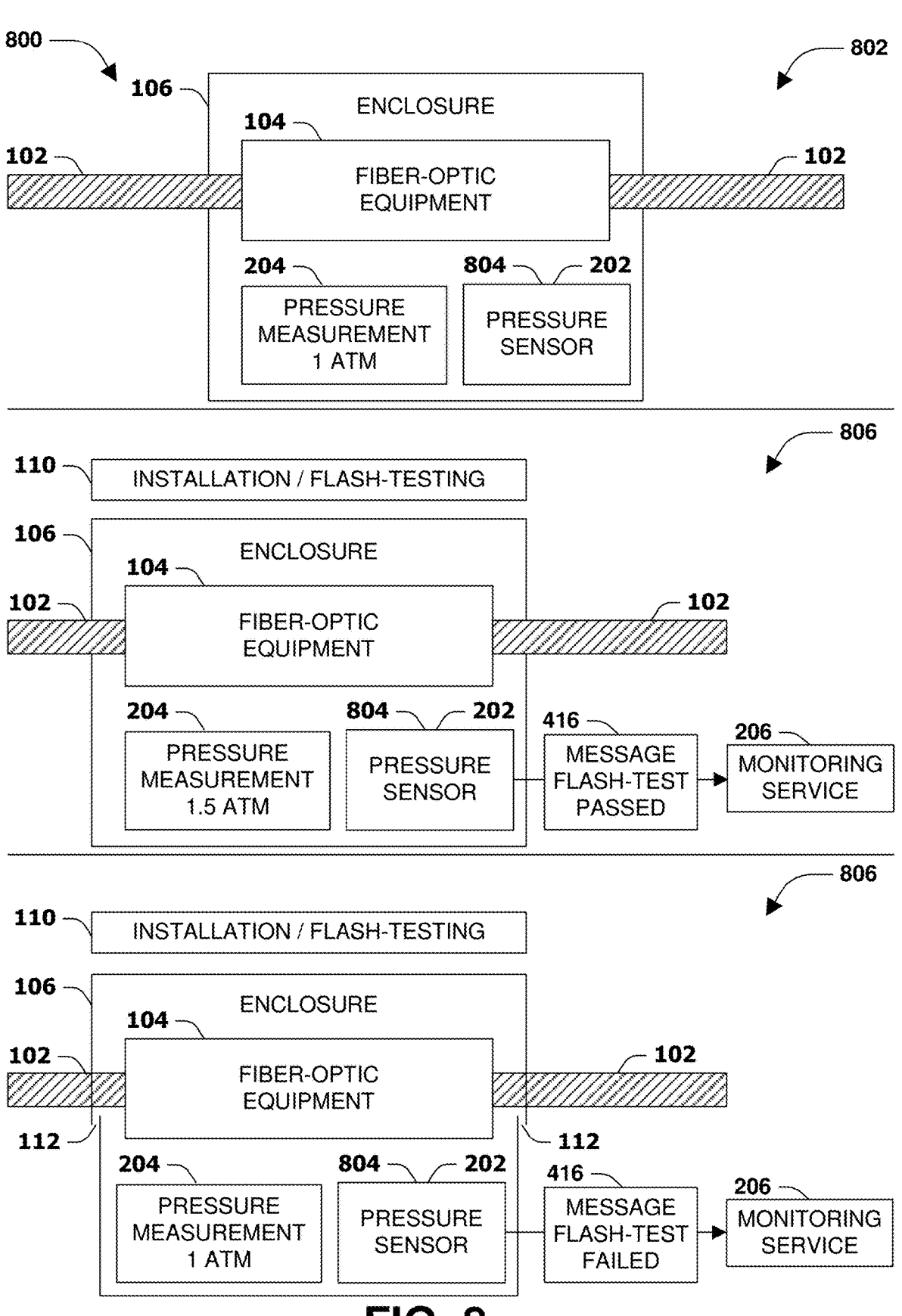
FIG. 8 is an illustration of an example scenario featuring an example monitoring of a flash-test performed on an enclosure in accordance with the techniques presented herein.

FIG. 8 is an illustration of an example scenario 800 featuring a first use of physical measurements 204 in the context of verifying flash-testing of an enclosure 106 after installation. In this example scenario 800, the enclosure 106 comprises (as an enclosure sensor 202) a pressure sensor 804 that measures the pressure inside the enclosure 106, and as a first example 802, the a pressure measurement 204 while the enclosure 106 is not sealed of approximately atmosphere. As a second example 806, during installation 110, the enclosure 106 may be pressurized (e.g., to 1.5 atmospheres) as a flash-test to verify that the enclosure 106 is fully sealed. The pressure sensor 804 may perform a pressure measurement 204 that indicates that the pressurized enclosure 106 holds the increased pressure for at least a threshold period, and the enclosure monitor 402 may transmit a message 416 to the monitoring service 206 comprising a flash-test report that indicates a successful flash-test. As a third example 808, an inadvertent gap 112 in the enclosure 106 may result in a failure of the enclosure 106 to hold the increased pressure during flash-testing, resulting in a pressure measurement 204 that does not change. The enclosure monitor 402 may transmit a message 416 to the monitoring service 206 comprising a flash-test report that indicates a failed flash-test, thus prompting the monitoring service 206 to request maintenance personnel 212 to inspect the enclosure 106 and/or perform a second attempt to flash-test the enclosure 106. Although not shown, another example involves an absence of any message 416 about flash-test results to the enclosure monitor 402, representing an omission of flash-testing by the maintenance personnel 212 during installation 110. In this manner, the enclosure monitor 402 may promote and verify the flash-testing of fiber-optic equipment 104 and enclosures 106.

Figure 9:
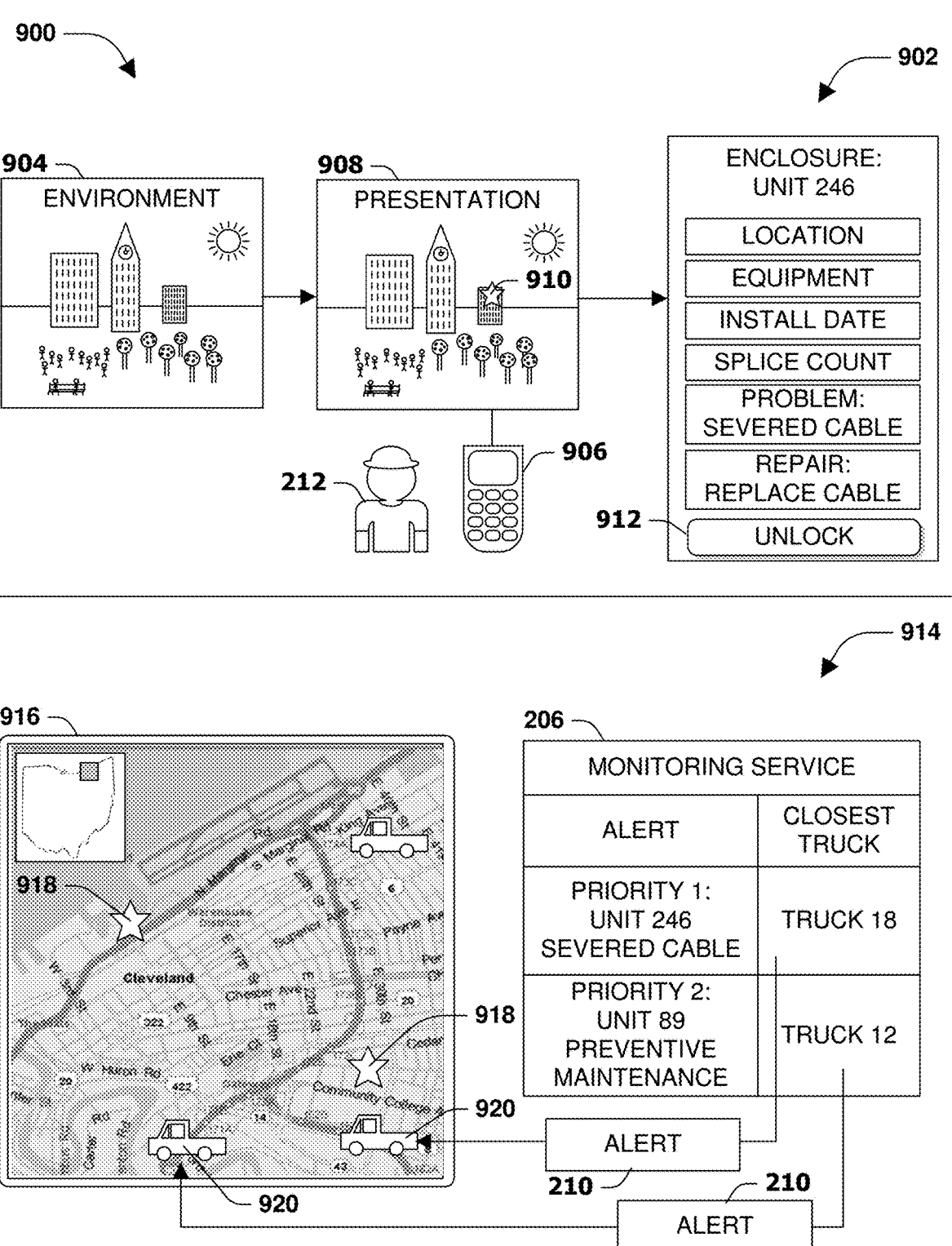
FIG. 9 is an illustration of an example scenario featuring various presentations of maintenance tasks to be performed on enclosures of fiber-optic equipment in accordance with the techniques presented herein.

FIG. 9 is an illustration of a set 900 of example scenarios illustrating some uses of the messages 416 from an enclosure monitor 402 about the physical measurements 204 of the enclosure 106. As a first variation 902 of this fourth aspect, the enclosure sensor 202 may further comprises at least one of a location sensor and an orientation sensor, and the messages 416 transmitted by the enclosure monitor 402 to a maintenance personnel device 906 (e.g., via RF, RFID, or Bluetooth) may include at least one of a location measurement from the location sensor of the enclosure 106 and an orientation measurement from the orientation sensor of the enclosure 106. Transmitting such messages 416 to the maintenance personnel device 906 may enable the maintenance personnel device 906 to present, to maintenance personnel 212, an augmented reality presentation 908 that depicts a view 904 of a local environment of the enclosure 106 overlaid with a depiction 910 of the location and/or orientation of the enclosure 106 within the environment. As a second such example, the messages 416 transmitted to the maintenance personnel device 906 may include a variety of information about the enclosure 106 that may assist the maintenance personnel 212 in performing maintenance tasks, such as the location (e.g., street address, room number, and/or geocoordinate) of the enclosure 106; the type of fiber-optic equipment 104 stored in the enclosure 106; the installation date and/or maintenance history of the fiber-optic cable 102, the fiber-optic equipment 104, the enclosure 106, and/or the enclosure monitor 402; information about the fiber-optic cable 102, such as a splice count and/or whether the fiber-optic cable 102 is fused or connectorized; a potential problem 208 indicated by the physical measurement 204; and/or a maintenance task to remediate the potential problem 208, such as inspection, testing, repair, and/or replacement of the fiber-optic cable 102, the fiber-optic equipment 104, the enclosure 106, and/or the enclosure monitor 402. As a third such example, the enclosure 106 may further comprise a lock that locks the enclosure monitor to reduce unauthorized access to the fiber-optic equipment 104. The personnel maintenance device 906 may include an option 912 to disengage the lock in order to permit the maintenance personnel 212 to access the contents of the enclosure 106, and may transmit such a request to the enclosure 106 upon activation by the maintenance personnel 212. The enclosure monitor 402 may further comprise a lock actuator that receives the request from maintenance personnel device 906 and unlocks the lock to permit access to the fiber-optic equipment 104. The enclosure monitor 402 may also accept requests to lock the enclosure 106 when maintenance is complete, and/or may notify the monitoring service 206 of locking and/or unlocking events arising with respect to the enclosure 106.

As a second variation 914 of this fourth aspect, a monitoring service 206 may utilize the messages 416 from the enclosure monitor 402 to facilitate the deployment of maintenance personnel 212. For example, the monitoring service 206 may have access to at least two maintenance personnel 212 who are capable of performing a maintenance task to address a potential problem 208 indicated by the physical measurements 204 (e.g., geocoordinates that respectively indicate the locations 920 within a region 916 of the maintenance personnel 212). The locations 920 of maintenance personnel 212 and the locations 918 of enclosures 106 (either all enclosures 106 or only those subject to a potential problem 208) may be displayed on a map interface for an administrator. As a second such example, the monitoring service 206 may, for the respective maintenance personnel 212, identify a distance of the maintenance personnel to the enclosure; identify a selected maintenance personnel 212 that, among the available maintenance personnel, has a shortest distance to the enclosure 106; and transmit an alert 210 to the selected maintenance personnel to request a maintenance task. As a third such example, the monitoring service 206 may identify maintenance tasks to be performed, respectively, on at least at least two enclosures 106, and may schedule, triage, and deploy maintenance personnel 212 according to priority. For example, the maintenance service 206 may identify a relative priority of the potential problems 208 indicated by the messages 416 from the respective enclosures 106, and triage the messages according to the relative priorities of the potential problems 208. The monitoring service 206 may also transmit alerts 210 of maintenance task to the maintenance personnel 212 according to the triaging of the messages 416 (e.g., first selecting and alerting maintenance personnel 212 to first address the most serious potential problem 208, and then iteratively selecting among the remaining maintenance personnel 212 to perform the remaining maintenance tasks in order of descending priority of the maintenance tasks). As one such example, priority may be established using a variety of factors, such as a value of performing the maintenance task (e.g., the severity, costliness, and/or inconvenience of a communication outage 118), and the monitoring service 206 may identify, and use in dispatching maintenance personnel 212, a relative priority that maximizes the value of performing the maintenance task. Many such configurations of monitoring services 206 and messages 416 about the physical measurements 204 within the enclosures 106 may be utilized in accordance with the techniques presented herein.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device comprising:
fiber-optic equipment for a fiber-optic cable;
a sealed enclosure that houses the fiber-optic equipment; and
an enclosure monitor comprising:
    one or more enclosure sensors that measure one or more physical measurements of one or more physical properties of the enclosure; and
    a transmitter that transmits, to a monitoring service, one or more messages about the one or more physical measurements of the one or more physical properties of the enclosure, wherein:
        the one or more enclosure sensors comprise at least one of a temperature sensor, a moisture sensor, a humidity sensor, a motion sensor, an orientation sensor, a vibration sensor, or a light level sensor that measures a physical property within the enclosure during testing of the enclosure,
        the one or more messages comprise a warning that the physical property measured within the enclosure during the testing indicates at least one of a test failure or a successful test, and
        the one or more physical measurements comprise a series of physical measurements of a physical property of the one or more physical properties and the one or more messages comprise:
           at least one message corresponding to a comparison of a reference value against the series of physical measurements demonstrating a trend in the physical property over a time period, wherein the trend predicts a potential failure.

2. The device of claim 1, wherein the transmitter transmits at least one message of the one or more messages to the monitoring service using the fiber-optic cable.

3. The device of claim 1, wherein the one or more enclosure sensors comprise at least one of:
a location sensor that measures a location of the enclosure; or
a grounding sensor that measures grounding of the fiber-optic equipment.

4. The device of claim 1, wherein the one or more messages comprise:
at least one message corresponding to a comparison of at least one of the one or more physical measurements with at least one historical average of the one or more physical measurements.

5. The device of claim 1, wherein the one or more messages comprise:
at least one message corresponding to a comparison of at least one of the one or more physical measurements with at least one expectation of the one or more physical measurements.

6. The device of claim 1, wherein the one or more enclosure sensors comprise a temperature sensor.

7. The device of claim 6, wherein the one or more messages comprise:
a message directed to selected maintenance personnel to dispatch the selected maintenance personnel to address the potential failure predicted by the trend in the physical property over the time period.

8. A device comprising:
fiber-optic equipment for a fiber-optic cable;
a sealed enclosure that houses the fiber-optic equipment; and
an enclosure monitor comprising one or more enclosure sensors that measure one or more physical measurements of one or more physical properties of the enclosure, wherein:
    the one or more enclosure sensors comprise at least one of a temperature sensor, a moisture sensor, a humidity sensor, a motion sensor, an orientation sensor, a vibration sensor, or a light level sensor that measures a physical property within the enclosure during testing of the enclosure, and
    the one or more physical measurements comprise a plurality of physical measurements of a physical property of the one or more physical properties over a time period indicative of a trend in the physical property that predicts a potential failure, and the device is configured to generate a message to dispatch selected maintenance personnel to address the potential failure predicted by the trend.

9. The device of claim 8, wherein the one or more enclosure sensors comprise a humidity sensor.

10. The device of claim 9, wherein the one or more enclosure sensors comprise a vibration sensor.

11. An enclosure monitor that monitors fiber-optic equipment for a fiber-optic cable and housed by a sealed enclosure, the enclosure monitor comprising:
an enclosure sensor, within the sealed enclosure, that measures a physical measurement of a physical property of the enclosure; and
a transmitter that transmits a localized transmission comprising a message about the physical measurement of the physical property of the enclosure, wherein:

the enclosure sensor comprises at least one of a temperature sensor, a moisture sensor, a humidity sensor, a motion sensor, an orientation sensor, a vibration sensor, or a light level sensor that measures the physical property within the enclosure during testing of the enclosure;

the message comprises a warning that the physical property measured within the enclosure during the testing indicates at least one of a test failure or a successful test, the localized transmission corresponds to a comparison of a reference value against a series of physical measurements of the physical property, including the physical measurement, demonstrating a trend in the physical property over a time period, and the trend provides a prediction and the trend predicts a potential failure.

12. The enclosure monitor of claim 11, wherein the localized transmission comprises at least one of cellular communication, wireless fidelity (WiFi) communication, radio frequency broadcast, Bluetooth, or direct-loading of information to an electronic device carried by associated maintenance personnel.

13. The enclosure monitor of claim 11, comprising a receiver mounted to the enclosure, the receiver configured to receive communication from associated maintenance personnel, the communication comprising at least one of radio frequency broadcast or WiFi communication.

14. The enclosure monitor of claim 11, wherein the enclosure sensor measures the physical measurement at a periodicity that conserves a limited power capacity of a power supply of the enclosure that powers the enclosure monitor.

15. The enclosure monitor of claim 14, wherein the transmitter transmits at a second periodicity that conserves the limited power capacity.

16. The enclosure monitor of claim 11, wherein the message is directed to selected maintenance personnel to dispatch the selected maintenance personnel to address the potential failure.

17. The enclosure monitor of claim 11, wherein the transmitter stores the message between a time at which the message is generated and a second time at which a data connection is established from a data store, the data store configured to relay the message to a monitoring service.

18. A device that provides a monitoring service for fiber-optic equipment located within a sealed enclosure, the device comprising:

a processor; and a memory storing instructions that, when executed by the processor, cause the monitoring service to:

receive, from an enclosure monitor, located within the sealed enclosure, a prediction message about a physical measurement of a physical property within an enclosure that has been detected by an enclosure sensor of the enclosure monitor, wherein the enclosure houses the fiber-optic equipment, and the enclosure monitor comprises at least one of a temperature sensor, a moisture sensor, a humidity sensor, a motion sensor, an orientation sensor, a vibration sensor, or a light level sensor;

evaluate the prediction message about the physical measurement to identify a potential problem with the fiber-optic equipment; and transmit to selected maintenance personnel:

an identifier of the fiber-optic equipment;

an alert of the potential problem with the fiber-optic equipment; and a maintenance task to apply to the fiber-optic equipment to remediate the potential problem.

19. The enclosure monitor of claim 11, wherein the enclosure sensor comprises a location sensor that measures a location of the enclosure.

20. The enclosure monitor of claim 11, wherein the enclosure sensor comprises a grounding sensor that measures grounding of the fiber-optic equipment.

* * * * *